United States Patent [19]
Glidewell et al.

[11] Patent Number: 6,152,651
[45] Date of Patent: Nov. 28, 2000

[54] UNDERGROUND SPRINKLER ELEVATING APPARATUS AND METHOD

[75] Inventors: Steven R. Glidewell; Leo T. Effenberger, both of El Paso, Tex.

[73] Assignee: EPAC, Inc., El Paso, Tex.

[21] Appl. No.: 09/292,885

[22] Filed: Apr. 16, 1999

[51] Int. Cl.$^7$ .................................................. E02B 11/00
[52] U.S. Cl. ............................... 405/36; 405/51; 239/206
[58] Field of Search ................................ 405/42, 36, 51; 239/206

[56] References Cited

U.S. PATENT DOCUMENTS

| | | |
|---|---|---|
| 2,779,949 | 2/1957 | Crispen . |
| 3,281,107 | 10/1966 | Lewis . |
| 3,335,959 | 8/1967 | Lockwood . |
| 3,709,435 | 1/1973 | Sheets . |
| 3,713,584 | 1/1973 | Hunter ..................................... 239/206 |
| 3,921,911 | 11/1975 | Sheets . |
| 4,014,502 | 3/1977 | Sheets . |
| 4,113,181 | 9/1978 | Sheets . |
| 4,850,532 | 7/1989 | Mackanos .................................... 239/1 |
| 4,906,131 | 3/1990 | Savoka ....................................... 405/36 |
| 5,037,238 | 8/1991 | Wait ........................................... 405/51 |

*Primary Examiner*—James A. Lisehora
*Assistant Examiner*—Alexandra K. Pechhold
*Attorney, Agent, or Firm*—Price Heneveld, Cooper, DeWitt & Litton

[57] ABSTRACT

An apparatus for raising a component of an underground sprinkler including a hydraulic actuator in fluid communication with a pressurized fluid source normally associated with an underground sprinkler system, and operably connected to a base of the underground sprinkler. The hydraulic pressure provided by the pressurized fluid source is used to drive the hydraulic actuator and adjust the level of the base of the underground sprinkler within the ground. In a particular embodiment, the hydraulic actuator includes a hydraulic cylinder and a wand in fluid communication with the pressurized water source. The wand is inserted into the ground around the sprinkler base, thus fluidizing the ground and allowing the operator to more easily move the sprinkler base.

13 Claims, 3 Drawing Sheets

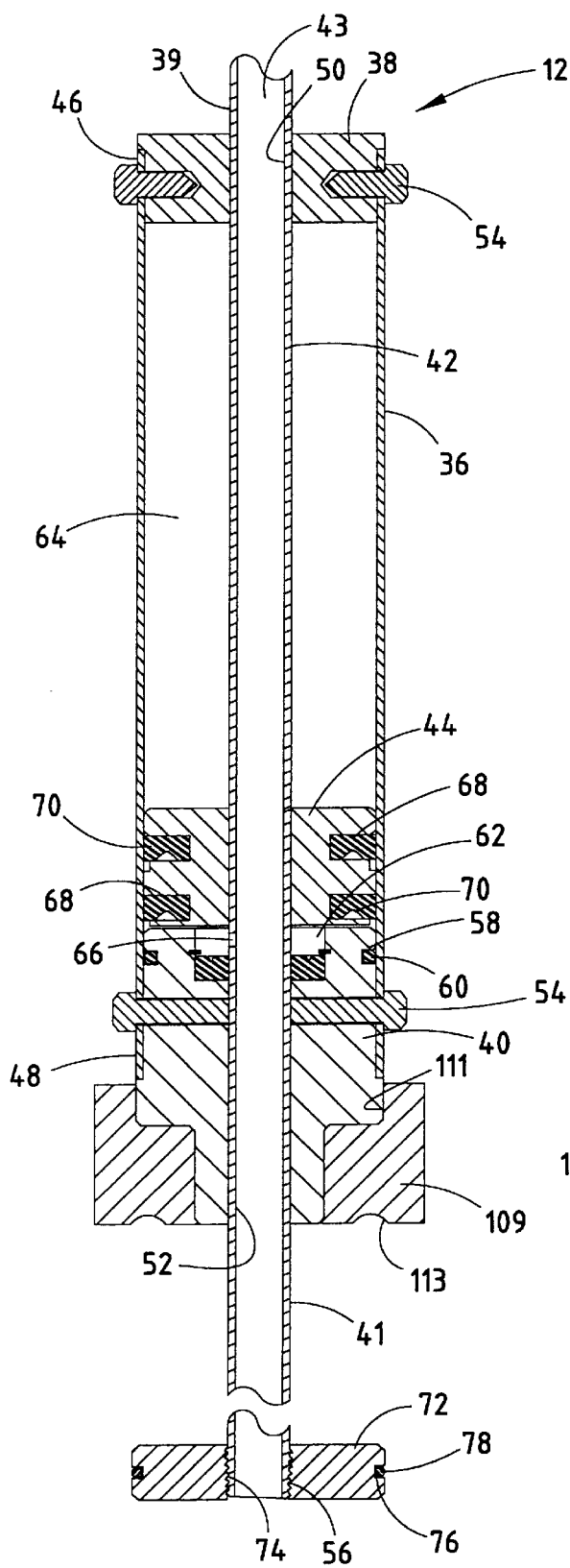
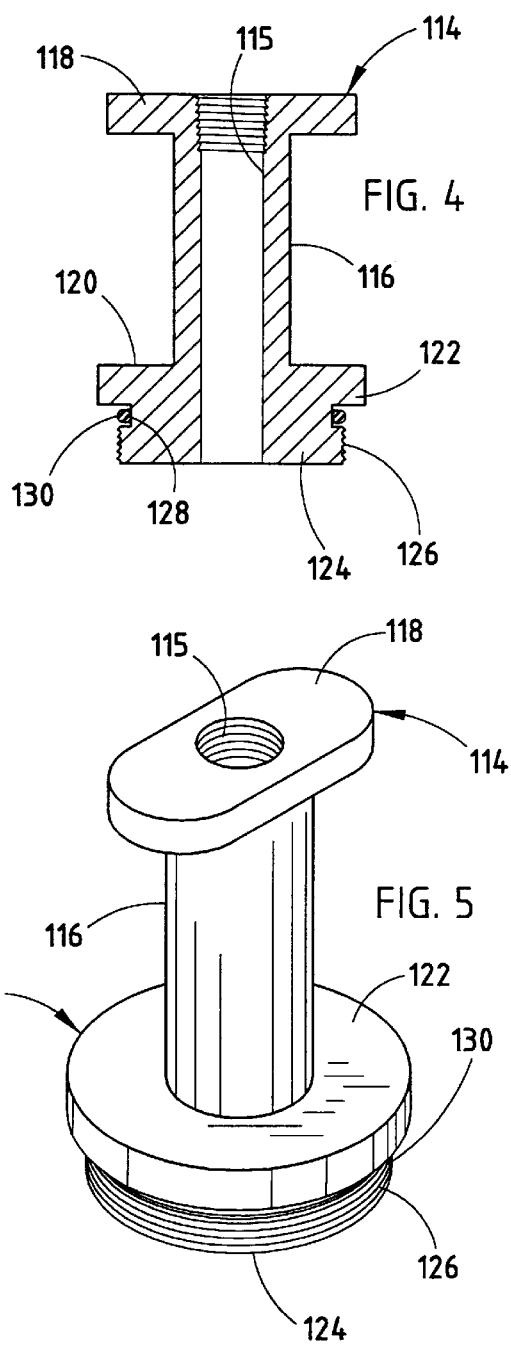
FIG. 3
FIG. 4
FIG. 5

UNDERGROUND SPRINKLER ELEVATING APPARATUS AND METHOD

BACKGROUND OF THE INVENTION

The present invention relates to an underground sprinkler elevating apparatus, and in particular to an elevating apparatus that utilizes the hydraulic pressure normally associated with underground sprinkler systems to elevate an underground sprinkler unit with minimal disturbance of surrounding turf.

Underground sprinkler systems are used in a wide variety of applications, such as golf courses, at domestic homes, and at business locations. The underground irrigation system or sprinkler is typically installed subsequent to the terrain being established. Sprinkler systems typically include a plurality of sprinkler units, a pressurized water source, and water supply lines providing fluid communication therebetween. Each individual sprinkler unit includes a receptacle bucket or base, and a sprinkler head received therein. Each sprinkler unit is typically associated with an electric valve that is activated by a central computer to allow water to travel from the pressurized water source to each sprinkler unit. When the valve is activated, the force of the water pressure forces the sprinkler head upward within the bucket thus allowing the sprinkler head to spray water in a full or partial circular pattern with a controlled radius e.g. of approximate 60 to 100 feet, depending on the type, as well as the pressure of the water.

The depth of each sprinkler base is important in that, if the base is too high, mowers can destroy the sprinkler unit by either running over them or cutting them, and if too low, the sprinkler will not elevate sufficiently to achieve the desired watering pattern. Therefore, the top of each sprinkler unit must rest flush with or recess slightly below ground level to ensure that no damage occurs.

A common problem with the sprinkler units is that, in time, each unit sinks into the ground due to traffic above the sprinkler unit generated by things such as mowers, golf carts, and walking traffic, as well as settling due to soil composition beneath the bucket. The component force of the water being sprayed from the sprinkler head of each sprinkler unit tends to force the sprinkler base downward into the damp ground. Further, grass clippings and blowing dust and dirt build up around the sprinkler heads, thus raising the effective ground level. As a result, the sprinkler units become too low with respect to ground level, thereby causing the water sprayed from the sprinkler head to contact the side of the hole the sprinkler unit sits within, thus resulting in the spray reaching only a part of its intended radius. Because of this, out lying grass is starved of water and may wilt or brown.

Typically, to correct the sinking of the sprinkler units, the sod or grass around the sprinkler units must be carefully peeled back or removed, the soil around each sprinkler unit removed to allow the sprinkler unit to be raised, the sprinkler unit manually raised, and dirt and sod replaced around each sprinkler unit. The manipulation of the ground about the sprinkler unit may cause the grass associated therewith to wilt or brown. Dirt, sand and other soils may be impossible to remove from the grass after the excavation, resulting in an aesthetically unappealing appearance. In addition, a hump typically remaining around the sprinkler unit may require days or weeks to settle to its original level height. These are particularly aggravating if on a golf course, or a carefully manicured lawn.

SUMMARY OF THE INVENTION

The novel apparatus of this invention allows the operator to return each sprinkler unit to an operating height without necessitating the removal of the sod and soil surrounding each sprinkler unit, thus making the "raising" operation much more efficient and time effective as well as less costly. By not removing or unduly manipulating the surrounding sod and soil, the chances of damaging or killing the grass surrounding each sprinkler unit one decreased. In addition, clean-up of the area about the sprinkler units is much easier due to the lack of soil that must normally be displaced from around each sprinkler unit. Finally, the sprinkler unit is raised to the correct height without creating a hump around the unit.

One aspect of the present invention is to provide an apparatus for raising the base of an underground sprinkler with a hydraulic actuator in fluid communication with the pressurized fluid source normally associated with an underground sprinkler system and operably connected to the base of the underground sprinkler. The hydraulic pressure provided by the pressurized fluid source is used to drive the hydraulic actuator and adjust the level of the base of the underground sprinkler within the ground. In a particular embodiment, the apparatus includes a wand in fluid communication with the pressurized fluid source. The wand, with water output, is inserted into the ground around the sprinkler base, thus fluidizing the ground and allowing the operator to more easily move the sprinkler base.

Another aspect of the present invention is to provide an apparatus for adjusting the level of an underground sprinkler, including a hydraulic cylinder comprising a cylinder housing, a hollow cylinder rod centrally disposed within the cylinder housing and having a first end in fluid communication with the pressurized fluid source and operably connected to the base, a second end, and a piston disposed within the cylinder housing and about the cylinder rod for dividing the cylinder into a first pressurizable compartment and a second compartment. The apparatus preferably further includes a fluid supply hose in fluid communication with the cylinder rod, a wand in fluid communication with the supply hose and having a probing tip adapted to penetrate the surface of the ground surrounding the sprinkler base, a trigger valve allowing the operator to control fluid flow through the wand, and, optionally a depth limiting stop adapted to limit the depth the tip may be inserted into the ground. Hydraulic pressure as provided by the pressurized fluid source is used to fluidize the ground surrounding the sprinkler base by way of the wand, and to drive the hydraulic cylinder to adjust the level of the base of the underground sprinkler within the ground. Rapid actuation of the valve can be used to create a hydraulic hammer effect at the sprinkler bucket and thus the pressurized compartment to control lifting of the bucket.

Yet another aspect of the present invention is to provide an improvement for adjusting the height of an underground sprinkler unit of an underground sprinkler system that includes at least one sprinkler unit comprising a removable sprinkler and a connector which may be a snap ring associated therewith, a pressurized water source, and water supply lines in fluid communication between the water source and the sprinkler unit, wherein the improvement includes a hydraulic cylinder. The hydraulic cylinder includes a cylinder housing, a hollow cylinder rod centrally disposed within the cylinder housing, and a piston disposed within the cylinder housing and about the cylinder rod, thereby dividing the cylinder into a first pressure compartment and a second compartment. The cylinder rod has a first end in fluid communication with the pressurized fluid source, and a second end. The hydraulic pressure provided by the pressurized fluid source is used to drive the hydraulic cylinder upwardly to adjust the level of the base of the underground sprinkler within the ground by transferring the fluid through the cylinder rod and into the first compartment of the hydraulic cylinder.

Still yet another aspect of the present invention is to provide a method for raising a base or bucket of an underground sprinkler including providing a hydraulic actuator, providing an underground sprinkler system that includes at least one sprinkler unit, a pressurized fluid source, and at least one fluid supply line providing fluid communication therebetween, and providing fluid communication between the hydraulic actuator and the pressurized fluid source. The method further includes operably connecting the hydraulic actuator with a component of the sprinkler unit, and force lifting the sprinkler unit by providing pressurized fluid to the hydraulic actuator.

These and other advantages of the invention will be further understood and appreciated by those skilled in the art by reference to the following written specification, claims and appended drawings.

BRIEF DESCRIPTION OF THE DRAWINGS

FIG. 3 is an enlarged cross-sectional side view of the hydraulic cylinder apparatus of the invention;

FIG. 4 is a cross-sectional side view of an alternative puck component of the apparatus; and FIG. 5 is a perspective view of the puck in FIG. 4.

DETAILED DESCRIPTION OF THE PREFERRED EMBODIMENT

Figure 1:
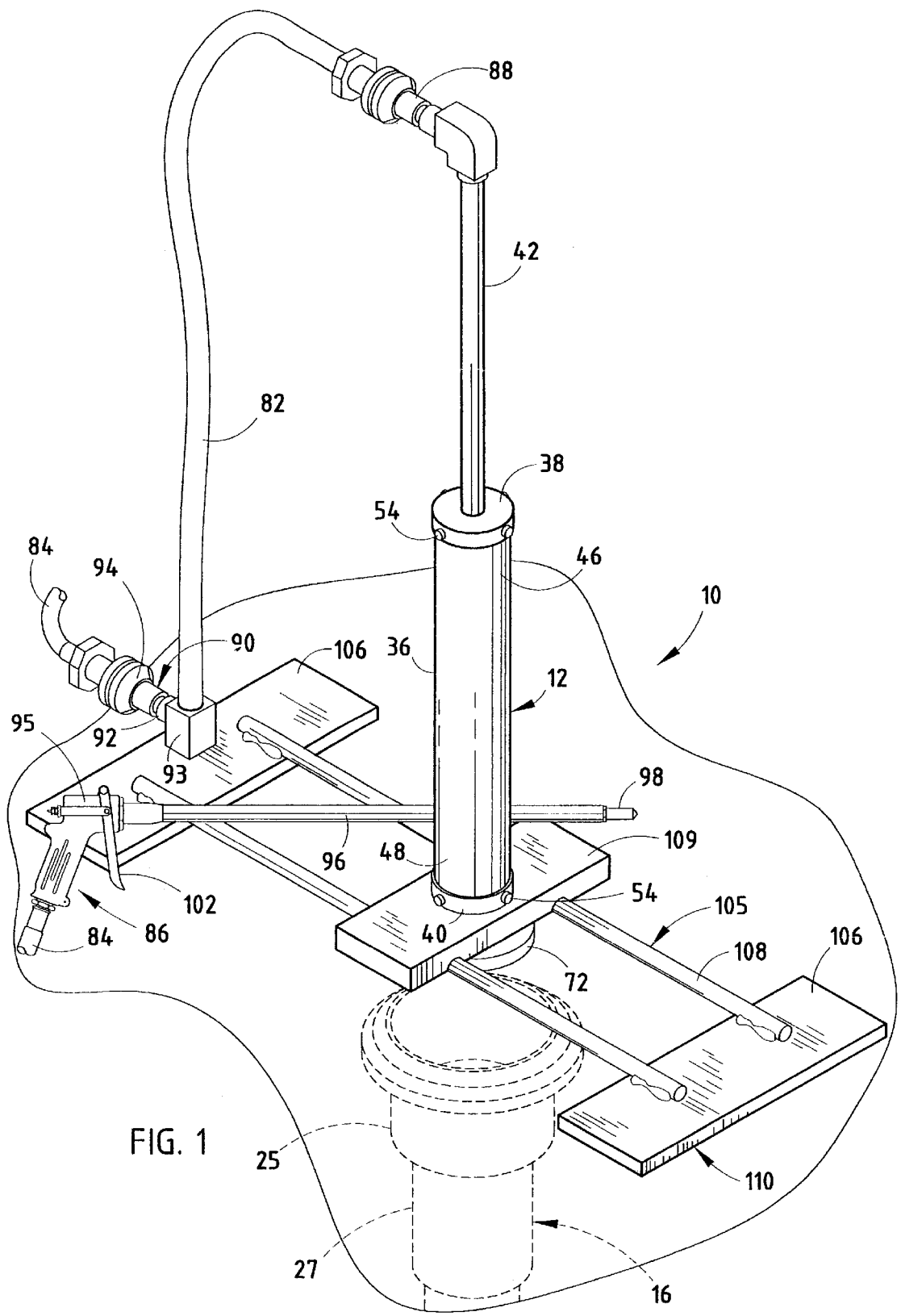
FIG. 1 is a top perspective view of an elevating apparatus embodying the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings and described in the following specification are exemplary embodiments of the inventive concepts defined in the appended claims. Hence, specific dimensions and other physical characteristics relating to the embodiments disclosed herein are not to be considered as limiting unless the claims expressly state otherwise.

The reference numeral 10 (FIGS. 1 and 2) generally designates an elevating apparatus 10 embodying the present invention. In the illustrated example, the elevating apparatus 10 includes a hydraulic actuator in the form of a hydraulic cylinder 12 in fluid communication with a pressurized fluid source 14 normally associated with an underground sprinkler system 15, and operably connected to a base or bucket 16 of an underground sprinkler unit 18. The hydraulic pressure provided by the pressurized fluid source 14 is used to drive the hydraulic cylinder 12 and adjust the level of the bucket 16 of the sprinkler unit 18.

Sprinkler system 15 includes sprinkler unit 18, pressurized fluid source 14, a plurality of water supply pipes 20 providing fluid communication between water source 14 and sprinkler unit 18, and electronic valve system 22. In a typical application, sprinkler system 15 includes at least one pressurized water source 14 and a plurality of sprinkler units 18 supplied therefrom. Sprinkler unit 18 includes bucket 16 and a sprinkler head 24. Bucket 16 is provided with an upper compartment 25 and a lower compartment 27. Water supply pipes 20 are connected to bucket 16 by way of a conventional swing joint 26 having a first swivel joint 28 and a second swivel joint 30 disposed on opposite ends thereof. Electronic valve 22 includes electronically controlled fluid lines 32 and valve 34 positioned between water supply pipes 20 and bucket 16 so as to control the water flow therebetween. Electronically controlled fluid lines 32 are used to open valve 34 and allow pressurized water supplied by water source 14 to be pumped through water supply pipes 20, into bucket 16, and to sprinkler head 24. The water pressure within bucket 16 normally forces sprinkler head 24 to rise up within bucket 16, thereby allowing sprinkler head 24 to rise above ground level 35.

Hydraulic cylinder 12 (FIGS. 1, 2, and 3) includes a cylinder housing 36, a first, upper end cap 38, a second, lower end cap 40, a hollow cylinder rod 42 centrally disposed within cylinder housing 36, and a movable piston 44 fixedly attached about cylinder rod 42. Cylinder housing 36 has a substantially cylindrical tubular shape having a first, upper end 46 and a second, lower end 48. First end cap 38 and second end cap 40 have centrally disposed apertures 50 and 52, respectively, through which rod 42 extends. Aperture 50 is configured to allow air to enter and leave cylinder housing 36, thereby equalizing the pressure therein with the ambient air surrounding the cylinder. Aperture 52 is configured to provide a water tight seal between second end cap 40 and cylinder rod 42. First end cap 38 and second end cap 40 are shown fixedly attached to first end 46 and second end 48 of cylinder housing 36, respectively, by way of a plurality of bolts 54. Second end cap 40 has a circumferentially extending annular groove or channel 58. In assembly, a water sealing rubber O-ring 60 is placed within channel 58 of second end cap 40, to form a water tight seal between second end cap 40 and cylinder housing 36. Cylinder rod 42 has a substantially cylindrical shape, a first upper end 39 that extends above first end cap 38, and a second lower end 41 that extends below second end cap 40. Ends 39 and 41 of cylinder rod 42 are each provided with male screw threads 56. Piston 44 is fixedly attached about cylinder rod 42 and is positioned within cylinder housing 36 so as to divide cylinder housing 36 into a first compartment 62 and a second compartment 64. Cylinder rod 42 is provided with a hollow interior 43, and an aperture 66 extending between hollow interior 43 and first compartment 62 of hydraulic cylinder 12. Piston 44 has two circumferentially extending annular grooves or channels 68. Rubber sealing rings 70 are placed within channels 68 of piston 44 to provide a water tight seal between piston 44 and cylinder housing 36.

Figure 2:
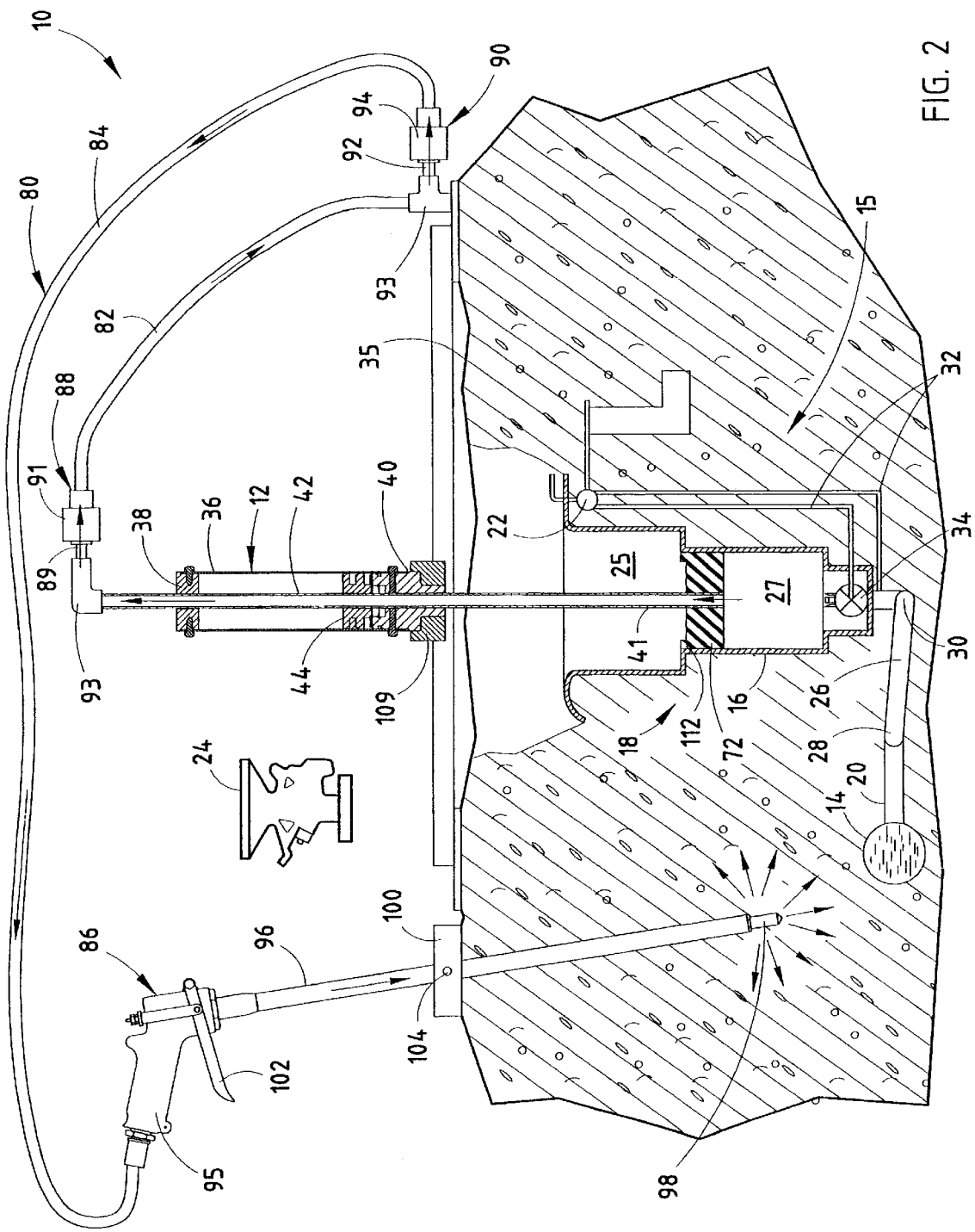
FIG. 2 is a side elevational sectional view of the elevating apparatus.

A cylindrically shaped puck 72 is adapted to fit within cylindrical lower compartment 27 of bucket 16. Puck 72 has a centrally located aperture 74 extending therethrough and a circumferentially extending annular groove or channel 76. A rubber O-ring 78 is positioned within channel 76 of puck 72 to form a substantially water tight seal between puck 72 and bucket 16 when puck 72 is placed within lower compartment 27 of bucket 16 (FIG. 2). The puck is connectable to the bucket as by a snap ring or screw threads as will be explained hereinafter.

Elevating apparatus 10 is shown to include a water line 80 including a first hose or conduit 82, a second hose 84, and a water wand 86 on the outer end of hose 84. A quick release coupling 88 provides fluid communication between cylinder rod 42 and first hose 82. A conventional quick release coupling 90 provides fluid communication between first hose 82 and second hose 84. Quick release coupling 88 includes a male adapter 89 and a female adapter 91 detachably mated therewith. Male adapter 89 is shown connected to first end 39 of cylinder rod 42 by way of a mating adapter 93. Quick release coupling 90 includes a male adapter 92 and a female quick release coupler 94 detachably mated therewith. Male adapter 92 is shown connected to first hose 82 by way of a T-shaped mating adapter 93. Second hose 84 provides fluid communication to wand 86. Wand 86 includes a trigger valve 95, a hollow probing rod 96, a probing discharge nozzle 98 at the distal end of rod 96, and a fixedly attached depth locator or stop 100 positioned along the length of probing rod 96 a controlled distance from nozzle 98. Trigger valve 95 includes a trigger 102 allowing the operator to control the flow of the water through water line 80. Probing rod 96 has a narrow cylindrical shape so as to be easily inserted into the ground surface. Probing nozzle 98 preferably has a narrow, conical shape so as to be easily inserted into the ground surface 35 and allow the wand 86 to be easily manipulated therein. Depth locator 100 is fixedly attached along the length of probing rod 96 at a point 104. Point 104 is located along the length of probing rod 96 such that the distance between point 104 and probing nozzle 98 is less than the distance between the ground surface 35 and water supply pipes 20 of sprinkler system 15 in the vicinity of sprinkler unit 18.

Elevating apparatus 10 includes a frame 105 having spaced, ground engagement base or footing members 106, rod shaped structural support members 108 extending between footing members 106, and a cylinder support 109 on members 108 to support hydraulic cylinder 12. Footing members 106 are shown to be substantially rectangular and have a substantially large bottom surface 110 to provide support for elevating apparatus 10. Structural support members 108 are shown to extend between footing members 106 in parallel fashion, and are preferably welded thereto. Structural support members 108 have a substantial length to space footing members 106 a distance apart, thereby providing stable support to elevating apparatus 10. Cylinder support 109 is shown to have a substantially rectangular shape, a graduated, centrally disposed aperture 111 therein, and a pair of downwardly exposed, laterally extending, parallel grooves 113. Parallel grooves 113 are spaced-apart a distance corresponding to the distance between structural support members 108, thereby allowing cylinder support 109, and therefor hydraulic cylinder 12, to be slidably positioned along the length of structural support members 108.

In application and operation, a conventional snap ring connector 112 which is normally used to retain sprinkler head 24 in bucket 16, is removed from within bucket 16, thereby allowing the removal of sprinkler head 24 from bucket 16. Puck 72, which is threadably engaged with lower end 41 of cylinder rod 42, is placed within lower compartment 27 of bucket 16 and snap ring connector 112 is then replaced within bucket 16 to thereby retain puck 72 within lower compartment 27 of bucket 16. Valve 34 is then opened by way of fluid lines 32, thus allowing pressurized water supplied from pressurized fluid source 14 to travel through water supply pipes 20 and into lower compartment 27 of bucket 16. The water is then forced upwards through hollow cylinder rod 42 and into the first i.e. lower compartment 62 of hydraulic cylinder 12 by way of aperture 66 in rod 42 to compartment 62. Pressurized water is also forced upwards through cylinder rod 42 and into water line 80, thereby potentially supplying water to wand 86. During the operation, probing nozzle 98 and probing rod 96 are normally inserted beneath the ground surface 35 at various locations surrounding bucket 16 to hydraullically loosen the soil around the bucket, for releasing the soil friction grip on the bucket. At each location, trigger 102 of wand 86 can be normally activated by the operator as desired, thereby causing pressurized water to flow through trigger valve 95 and outward from probing nozzle 98. The insertion of pressurized water causes the sod, dirt, or sand surrounding bucket 16 to loosen or liquidize. The loosening or liquidization of the materials surrounding bucket 16 allows bucket 16 to be more easily manipulated within the ground. The bucket 16 is hydraulically raised when water forced through cylinder rod 42 and into first compartment 62 of hydraulic cylinder 12 causes piston 44 to travel upwardly within hydraulic cylinder 12. The upward movement of piston 44 creates an upward force on bucket 16 by way of snap ring 112, puck 72, and cylinder rod 42, thereby urging bucket 16 in incremented amounts towards the ground surface 35. These incremental movements can be further controlled by actuating and deactuating the wand valve, and thereby causing a hydraulic hammer action on the bucket. Swing joint 26 between water supply pipes 20 and bucket 16 allows bucket 16 to be raised upwardly without becoming detached from pressurized water source 14.

Numerous styles and configurations of bucket 16 are currently in use throughout the market. As a result, puck 72 may be provided in many alternate embodiments of numerous shapes, sizes and configurations, as well as different modes of attaching to the bucket. As illustrated in FIG. 4, an alternate embodiment puck device 114 includes a shaft 116, an ovular upper end forming a pair of outwardly extending flats 118, and a lower puck portion 120. Puck device 114 is provided a centrally disposed threaded aperture 115 extending completely therethrough and attachable to threaded rod 42. Lower puck portion 120 includes an upper puck section 122 and a lower puck section 124 having a slightly smaller radius than upper puck section 122. Lower puck section 124 is provided with male threads 126 adapted to engage cooperative female threads in the bucket 16. Flats 118 provide a gripping surface that assist in threading the puck device 114 onto rod 42 as well as into bucket 16. Puck 114 has a circumferentially extending annular groove or channel 128 between upper puck section 122 and lower puck section 124 for locating an O-ring 130 therein, thereby providing a substantially water tight seal between puck 114 and bucket 16. Puck 114 is used almost identically to puck 72 as previously described except that puck 114 is threadably engaged with bucket 16, thereby eliminating the need for snap-ring 112.

Repeated experimentation at locations such as golf course fairways has shown tremendous advantages over conventional apparatuses and techniques of raising sprinklers. Elevating apparatus 10 eliminates the need to remove turf, soil, and other materials from around bucket 16, that normally results in disfiguration and destruction of the ground surface 35 surrounding each sprinkler unit 18. By eliminating the need to remove or unduly manipulate the surrounding soil and sod, the chances of damaging the grass surrounding each sprinkler unit 18 are greatly decreased. In addition, clean-up of the area about each sprinkler unit 18 is much easier due to the lack of soil that is displaced. Further, the sprinkler unit 18 is readily raised to the correct height without creating a hump around the unit. The amount of physical labor is greatly reduced, the time of repair is greatly shortened, and the results are superior.

In the foregoing description, it will be readily appreciated by those skilled in the art that modifications may be made to the invention without departing from the concepts disclosed herein. Such modifications are to be considered as included in the foregoing claims, unless these claims by their language expressly state otherwise.

The invention claimed is as follows:

1. An apparatus for adjusting the level of an underground sprinkler having a bucket, comprising:

a hydraulic cylinder assembly including a cylinder housing, a hollow cylinder rod disposed within the cylinder housing and having a fluid coupler for fluid communication with a pressurized water source, the cylinder rod having a lower end connector for operably connecting to the bucket, and a piston disposed within the cylinder housing and about the cylinder rod dividing the cylinder into a first lower compartment and a second upper compartment;

the hollow cylinder rod having a fluid flow orifice to the first lower compartment;

a fluid supply hose for connecting the pressurized water source in fluid communication with the cylinder rod and the first lower compartment;

a wand having a fluid conduit for fluid communication with the pressurized water source and having a probing tip adapted to penetrate the surface of the ground surrounding the sprinkler base; and a trigger valve allowing an operator to control fluid flow through the wand;

whereby hydraulic pressure provided by the pressurized fluid source is used to fluidize the ground surrounding the sprinkler base by way of the wand, and to drive the hydraulic cylinder to raise the level of the bucket of the underground sprinkler within the ground.

2. An apparatus for raising a component of an underground sprinkler, comprising:

a hydraulic actuator having a ground engaging base, a fluid coupler for providing fluid communication between a pressurized water source normally associated with an underground sprinkler system and the hydraulic actuator, and a connector for operably connecting the hydraulic actuator to a component of an underground sprinkler unit, the ground engaging base supporting the hydraulic actuator above the component of the underground sprinkler;

whereby water pressure provided by the pressurized water source can be used to drive the hydraulic actuator and lift the level of the component of the underground sprinkler unit within the ground.

3. The apparatus as described in claim 2, wherein:

the hydraulic actuator includes a hydraulic cylinder.

4. An apparatus for raising a component of an underground sprinkler, comprising:

a hydraulic actuator having a ground engaging base, and a hydraulic cylinder that includes a cylinder housing, a hollow cylinder rod disposed within the cylinder housing and being in fluid communication with the pressurized water source and being operably connectable to the component of the underground sprinkler unit, and a piston disposed within the cylinder housing and about the cylinder rod dividing the cylinder housing into a first lower compartment and a second upper compartment, a fluid coupler for providing fluid communication between a pressurized water source normally associated with an underground sprinkler system, and a connector for operably connecting the hydraulic actuator to a component of an underground sprinkler unit;

whereby water pressure provided by the pressurized water source can be transferred through the cylinder rod into the first compartment of the hydraulic cylinder to elevate the cylinder rod and thereby lift the connected component of the sprinkler unit.

5. The apparatus as described in claim 4, further including:

a fluid supply line in fluid communication with the cylinder rod;

wherein the supply line allows the operator to fluidize the ground surrounding the sprinkler unit.

6. The apparatus as described in claim 5, wherein:

the supply line includes a wand adapted to penetrate the surface of the ground surrounding the sprinkler unit.

7. The apparatus as described in claim 6, wherein:

the wand includes a probing tip adapted to penetrate the surface of the ground surround the sprinkler unit.

8. The apparatus as described in claim 7, wherein:

the wand further includes a trigger valve allowing the operator to control fluid flow through the wand.

9. The apparatus as described in claim 8, wherein:

the wand further includes a depth limiting stop adapted to limit the depth the tip may be inserted into the ground.

10. The apparatus as described in claim 2, wherein said connector is:

a snap ring detachably connected to the component of the sprinkler unit; and a puck fixedly attached to the hydraulic actuator and operably retained to the component of the sprinkler unit by the snap ring.

11. The apparatus as described in claim 2, wherein said ground engaging base includes:

a frame supporting the hydraulic actuator above the component of the sprinkler unit.

12. The apparatus in claim 2, including a puck fixed attached to the hydraulic actuator and wherein said connector comprises a threaded engagement between said puck and said component of the underground sprinkler unit.

13. The apparatus as described in claim 11, wherein:

the frame includes at least two footing members adapted to be positioned on substantially opposite sides of the sprinkler base and at least one structural support member extending between the footing members and supporting the base member thereon.

* * * * *